Dec. 11, 1928.
W. A. HARRELL
1,694,852
KAFIR CORN HEADER
Filed Aug. 28, 1925    2 Sheets-Sheet 1
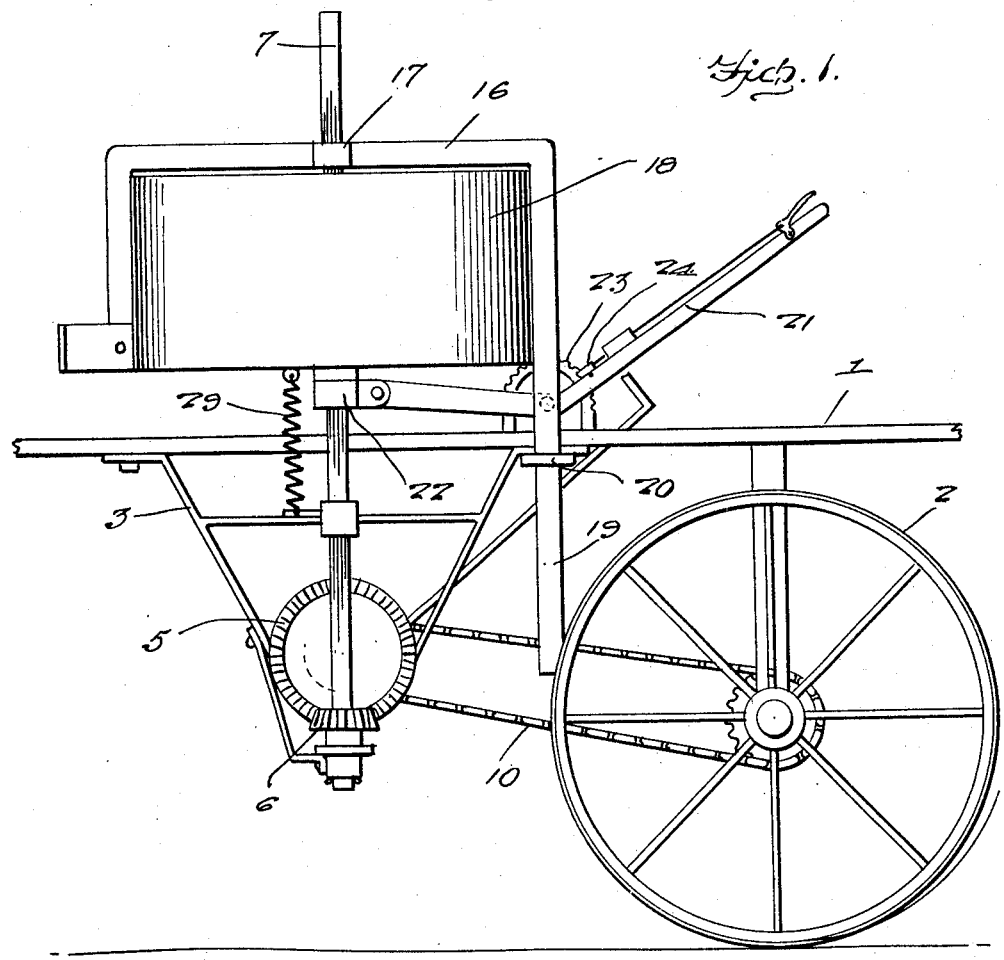
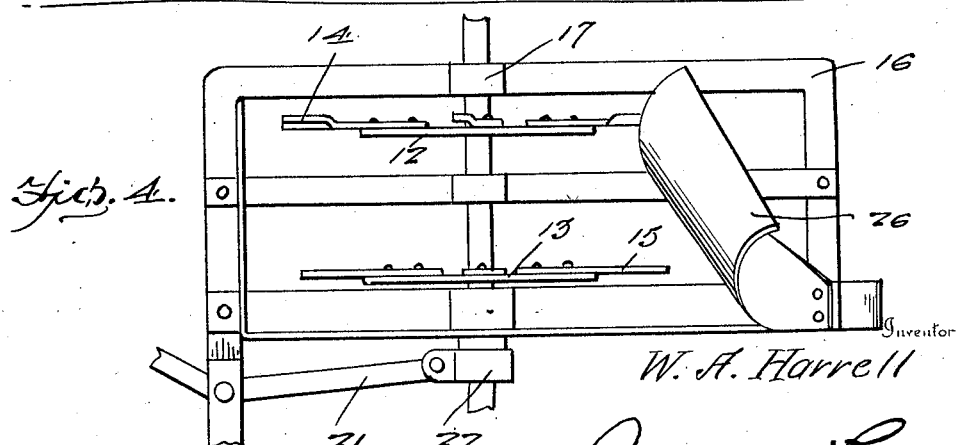
Inventor
W. A. Harrell
By Clarence A. O'Brien
Attorney Dec. 11, 1928.

W. A. HARRELL

KAFIR CORN HEADER

Filed Aug. 28, 1925

Inventor
W. A. Harrell
By Clarence A. O'Brien
Attorney

Patented Dec. 11, 1928.

1,694,852

UNITED STATES PATENT OFFICE.

WALTER A. HARRELL, OF RICHLAND, KANSAS.

KAFIR-CORN HEADER.

Application filed August 28, 1925. Serial No. 53,104.

This invention relates to an improved machine for farm use which is adapted more particularly for topping or heading Kafir corn and similar grains.

An important object is to provide a structure of this kind which may be mounted upon a conventional rack wagon, the structure being such as to permit the operating power to be derived from one of the ground engaging wheels of said wagon.

Another object is to provide a structure of this kind including a vertical driven shaft upon which superimposed disks are mounted, the lower disk carrying cutting knives and the upper disk carrying cooperating beaters, whereby to permit the knives to cut the heads off of the stalks, after which the beater elements come into play for knocking the severed heads onto a collecting platform.

Other objects and advantages of the invention will become apparent from the following description and drawings.

In the accompanying drawings forming a part of this application and in which like numerals are employed to designate like parts throughout the same:—

Figure 1 is a side elevation of a machine constructed in accordance with the present invention.

Figure 4 is an inside elevation on an enlarged scale.

Figure 2:
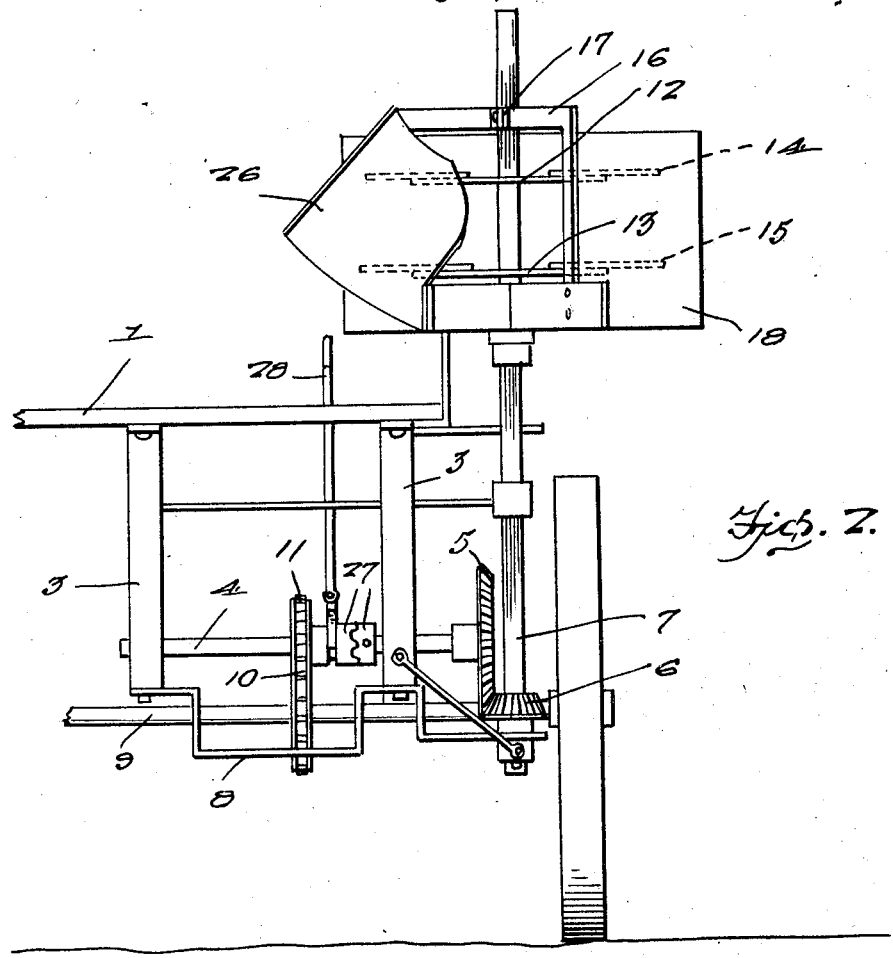
Figure 2 is an end elevation of the same.

Referring to the drawings in detail, the reference character 1 designates a platform of what is known as a rack wagon, and 2 designates one of the rear ground engaging wheels of this wagon. The present improvements is in the form of an attachment which is connected with the platform 1. The attachment comprises a pair of hangers 3. A horizontal shaft 4 is journaled in appropriate bearings in these hangers and is provided on its outer end with a relatively large beveled gear 5 which is in mesh with a beveled pinion 6, this pinion being on a vertical driven shaft 7. It will be noted from Figure 2 that a horizontal strap 8 is connected with the intermediate bottom portions of the two hangers and extends over and is equipped with a bearing in which the shaft 7 is mounted for rotation. Adjacent these details is a horizontal rotatable axle 9 of the wagon. There is a sprocket mounted on this axle and a sprocket chain 10 is trained thereover and over a spocket 11 on the super-imposed shaft 4. In this way power is derived from the axle 9 and through the medium of the chain and socket connection is imparted to the shaft 4. The shaft 4 drives the vertical shaft 7 through the medium of the intermeshing gears 5 and 6. Any number of suitably designed braces are employed to increase the rigidity of structure.

Figure 3:
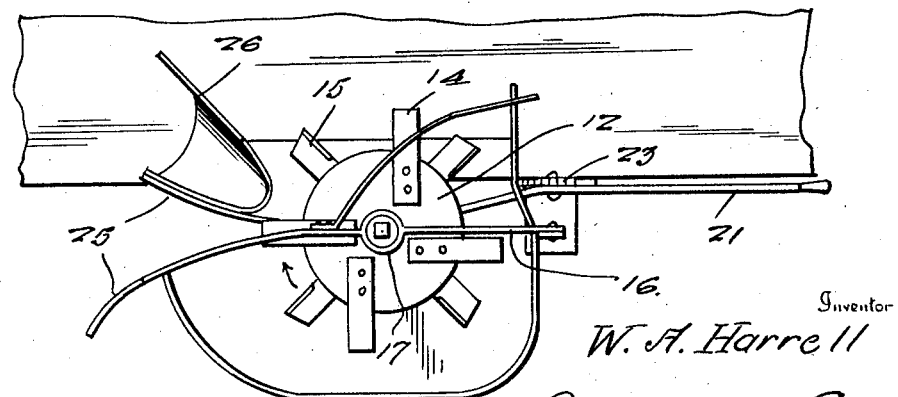
Figure 3 is a top plan view thereof.

It will be noted that the shaft 7 extends a considerable distance above the platform 1. It is upon this extended portion that the heading means is mounted. This means comprises upper and lower disks 12 and 13 which are mounted to rotate with the vertical shaft. The upper disk is provided with outstanding beater fingers 14 arranged at circumferentially spaced points while the lower disk is provided with cutting blades or knives 15. From the top plan view as shown in Figure 3 it will be seen that the cutting blades are slightly in advance of the beating fingers, this being desirable for accomplishing the successive action of the knives and beaters. Associated with these parts is a frame 16 having a central guide 17 vertically slidable on the shaft 7. This frame constitutes a mounting for a substantially arcuate metal shield 18 which partially encloses the cutting means to act as a guard. From Figure 1 it will be noted that one leg 19 of the frame is comparatively long and extends downwardly through a relatively stationary guide bracket 20 whereby to permit the unit made up of the guard, frame and disks to be lifted bodily in a vertical direction. To accomplish this I provide a hand lever 21 which is pivotally mounted upon the platform. The inner end of the lever is formed with a collar 22 surrounding the shaft 7 beneath the vertically movable unit. By rocking the outer end of the lever downwardly, this unit can be lifted up on the shaft to dispose the cutting and beating means in the proper horizontal plane to accommodate corn stalks of different heights. There is a toothed segment or rack 23 on the platform and a pawl is mounted on the lever for cooperation therewith. In this way the lever may be locked in a different position to which it is moved to hold the vertically movable unit in the plane to which it has been adjusted. At this time I would direct attention to Figure 3 wherein it will be seen that this unit is provided with cooperating guides 25 serving to feed the stalks into the cutting means. One of these guides carries an inclined channel-shaped chute 26 which is disposed over the platform. This chute is arranged to cooperate with the rotary beater in a manner to be hereinafter described.

It is yet to be pointed out that an appropriate clutch 27 (see Figure 2) is associated with the shaft 4 and an operating lever 28 is provided for actuating the same. Moreover a coiled spring 29 (see Figure 1) is connected to the vertically movable unit at one end and to one of the hangers 3 at its opposite end for pulling the unit downwardly when the lever 21 is allowed to resume its uppermost position.

In the operation of the improved machine it will be seen that as the wagon travels down the field, the cutting and beating means will be operated from the ground wheel 2 through the chain and sprocket connection, gearing etc. Of course this is controlled by the operation of the clutch 27. As before intimated the element or unit made up of the shield cutting and beating means is raised to the proper horizontal plane to insure alignment of the cutting means with the heads of the stalks. Said heads are severed by the cutting means, and then the beating elements come into engagement therewith and knock these severed heads into the chute 26, after which they fall on to the platform 1 to be bundled or otherwise collected.

It is believed that by considering the description in connection with the drawings persons skilled in the art to which the invention relates may be able to attain a clear understanding of the same. Therefore a more lengthy description is thought unnecessary.

While the preferred embodiment of the invention has been shown and described, it is to be understood that minor changes coming within the field of invention claimed may be resorted to if desired.

I claim:—

In a structure of the class described, in combination, a pair of spaced parallel hangers, a horizontal shaft journaled in bearings in said hangers, a rotatable wheel axle, an operating connection between the axle and shaft, a vertically disposed driven shaft, an operating connection between the vertical shaft and the horizontal shaft, a unit slidable upon said shaft, said unit comprising a rectangular frame having a depending leg, a guide through which said leg extends, a shield mounted upon said frame, a cutter embodying a disk carrying cutting knives, a beater embodying a disk carrying beating fingers, a chute located for cooperation with the beater, a lever pivotally mounted upon a support, one end of said lever being engaged with said unit for raising it, and retaining means for the lever.

In testimony whereof I affix my signature.

WALTER A. HARRELL.